United States Patent Office 2,701,000
Patented Feb. 1, 1955

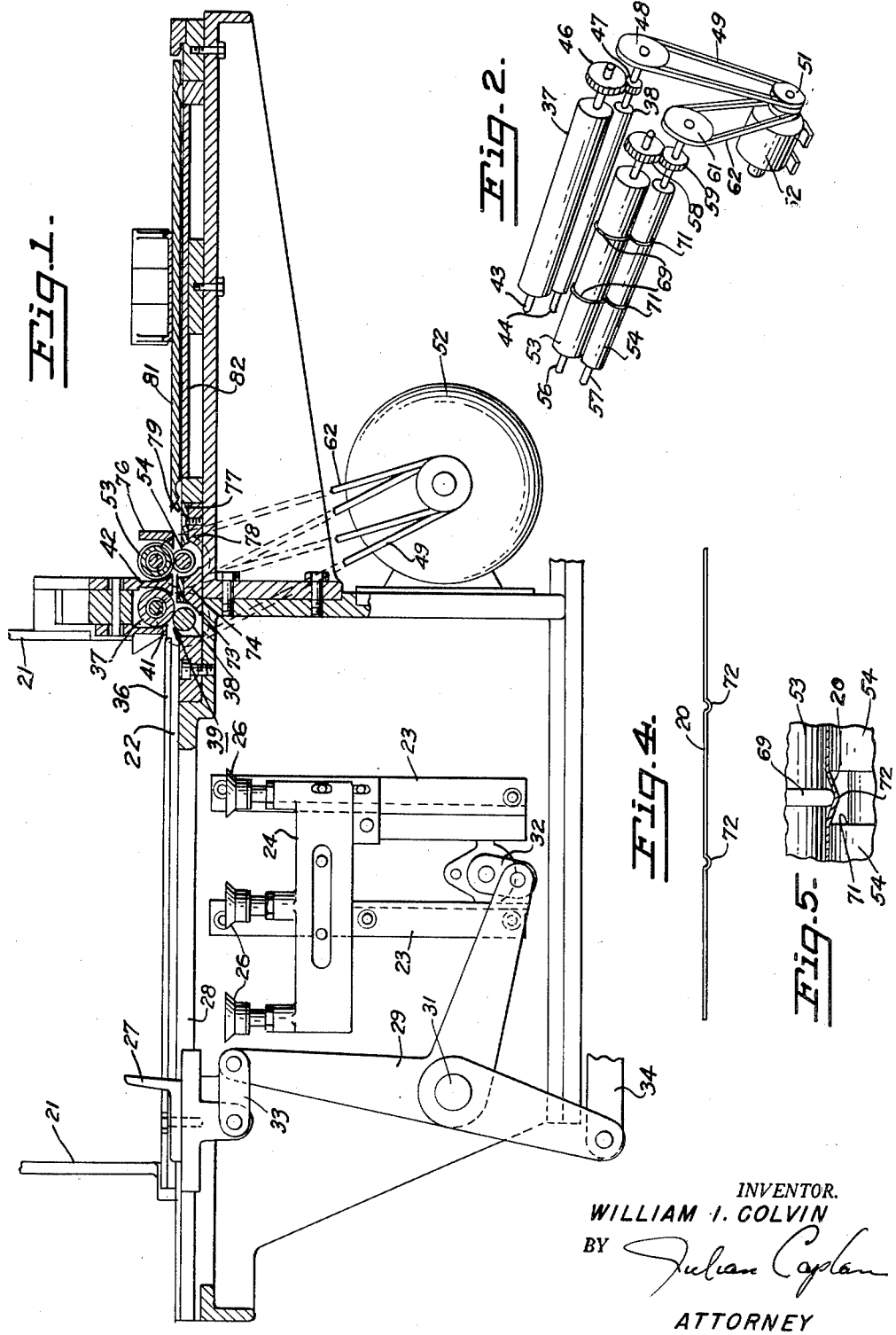
Feb. 1, 1955 — W. I. COLVIN — 2,701,000
BEADED CAN BODY MAKER MACHINE
Filed Jan. 31, 1949 — 3 Sheets-Sheet 1
INVENTOR.
WILLIAM I. COLVIN
ATTORNEY

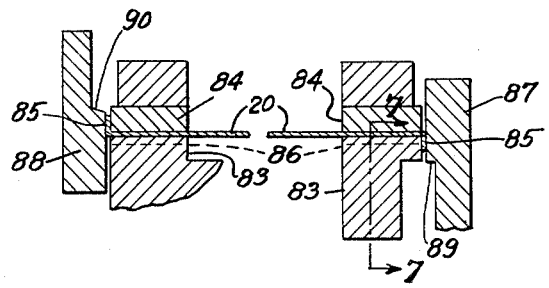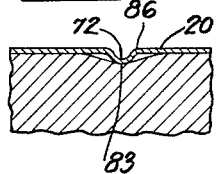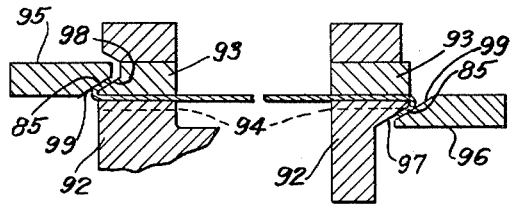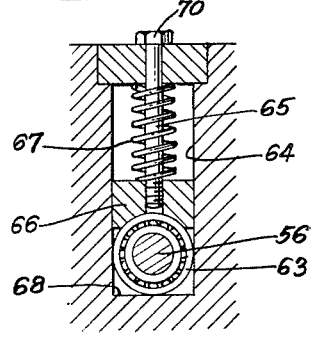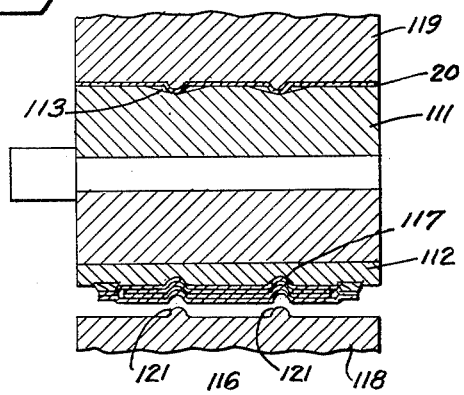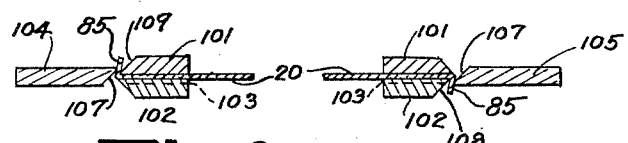

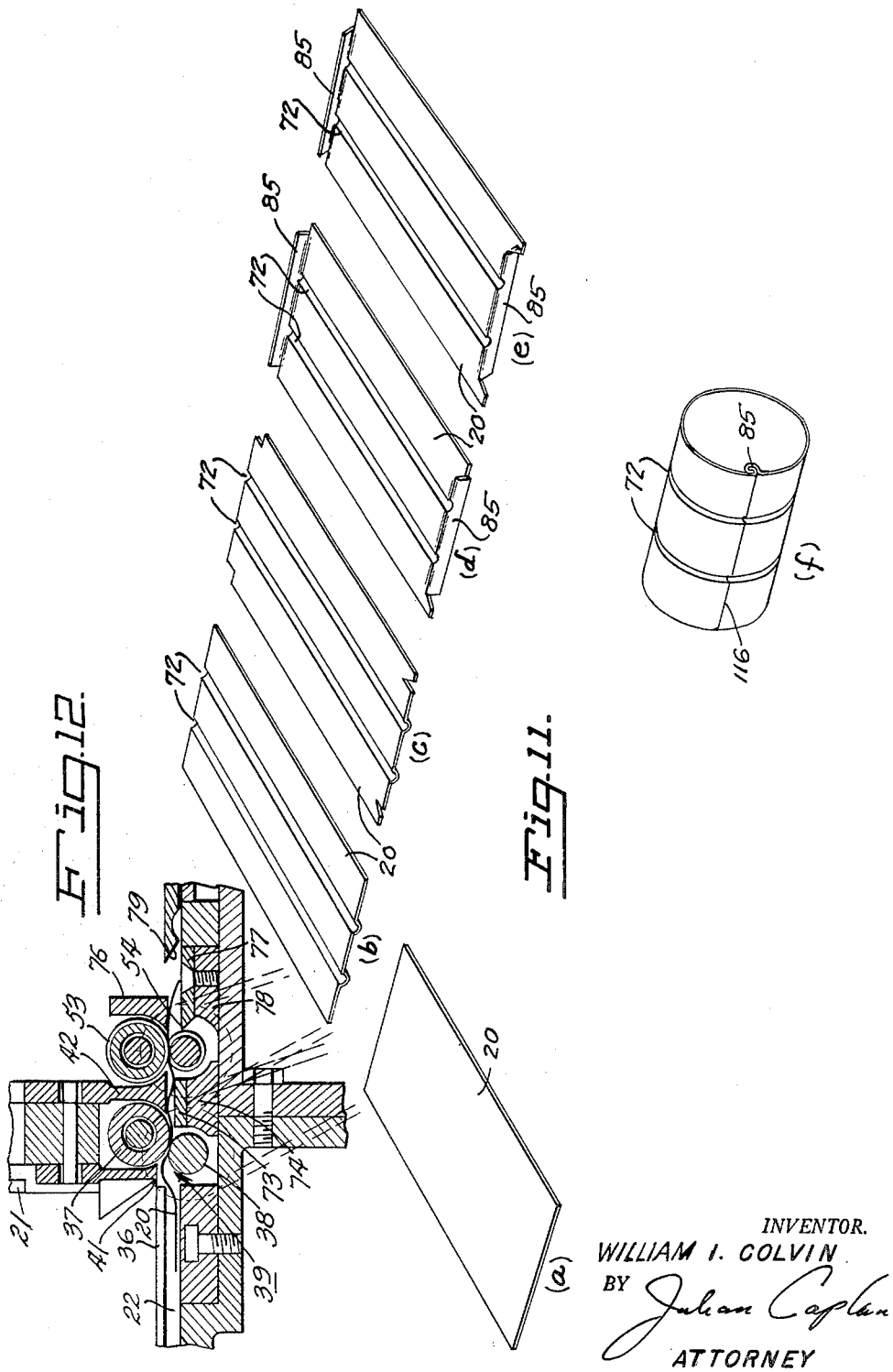

2,701,000

BEADED CAN BODY MAKER MACHINE

William I. Colvin, Modesto, Calif., assignor to Pacific Can Company, San Francisco, Calif., a corporation of Nevada Application January 31, 1949, Serial No. 73,720

2 Claims. (Cl. 153—2)

This invention relates to new and useful improvements in body makers for beaded cans and method of forming beaded cans. At the present time, it is common to form one or more circular beads about the cylindrical surface of a can body, each of said beads lying on a section transverse to the axis of the can body. The purpose of the beads is to assist in preventing "paneling" of the can after sealing and in general to give the body greater rigidity. Beading is prevalent in connection with larger cans, particularly when the contents are packed under vacuum or pressure. The beads may be either indented in or projecting from the body.

Customarily, the beads are formed by rolling the body after the body blank has been formed into cylindrical shape between a pair of rollers, one roller having raised beads and the other cooperating grooves. Because of the stiffness of the body in the region adjacent the side seam, where there are four thicknesses of tinplate, the bead is ordinarily not made continuous but instead is interrupted in the region of the side seam. This latter feature results in a can body of somewhat irregular shape and is generally less desirable than if the beads are continuous. Further, when beading is done after the can body is formed into cylindrical shape, it is necessary to employ a separate machine, and conveying the can body to and from the machine requires special equipment and labor.

The formation of beads in the blank while the blank is flat, in accordance with the present invention, has advantages over the above-described method in that the beads may be made continuous in the region of the side seam, an extra machine is not required and there is a saving in conveying equipment and labor used in conjunction with the separate beading machine.

One of the features of this invention is that beading is performed after the blank has passed through the flexer. In other words, in the present invention the beads are formed after the blank has already been stretched so that its "grain is broken" as that term is understood in this art so that in forming the cylindrical body the tendency of the sides to "panel" is reduced. Thus the possibility that the blank may be ruptured if flexing and beading are carried out at the same time is eliminated.

Another object and advantage of the present invention is that the bead once imparted to the blank immediately after the flexing operation is preserved during subsequent forming operations when the blank is clamped in position. Preservation of the beads in the blank is accomplished by forming grooves in the clamps holding the blank and in the horn while subsequent forming operations are being carried out, the beads of the blank extending into the grooves and not being crushed when the clamps grip or the horn is bumped. The bumper for the horn is provided with beads to reform the beads in the edges of the blank in which region the beads have been flattened by the edging dies.

With the above and other objects and advantages in view, the invention consists in the matters hereinafter set forth and more particularly pointed out in the appended claims, reference being had therein to the accompanying drawings, in which:

Fig. 1 is a vertical section taken transversely through a bodymaker;

Fig. 2 is a perspective of flexing and beading rolls and associated driving mechanism;

Fig. 3 is a section of a beading roll bearing mounting;

Fig. 4 is a section of a beaded blank;

Fig. 5 is an enlarged view of the beading rolls with the blank therebetween;

Fig. 6 is a vertical section of a portion of a first edging station;

Fig. 7 is a section of a portion of one of the clamp members taken along the line 7—7 of Fig. 6;

Fig. 8 is a vertical section of a portion of a second edging station;

Fig. 9 is a vertical section of a portion of a single station edging machine, said view constituting a modification;

Fig. 10 is a sectional view of a horn, bumper and associated parts;

Fig. 11 is a schematic view showing various stages in the formation of a body blank: (a) flat, before beading; (b) after beading; (c) after notching; (d) after first station edging; (e) after second station edging or after single station edging; and (f) cylindrical body.

Fig. 12 is an enlarged, fragmentary, vertical sectional view showing the path of travel of a blank through the flexing and beading rolls.

The bodymaker illustrated in the accompanying drawings is, to some extent, of conventional construction. The present invention may be employed with other bodymakers of the general type herein described. In order to set forth the present invention, a description of only those portions of the bodymaker which facilitate an understanding of the invention are illustrated and described; the construction of the other portions of the bodymaker will be understood and recognized by those skilled in the can making art, and a complete description of the machine is accordingly not included.

As shown principally in Fig. 1, the feed mechanism of the machine is designed to feed can body blanks 20 one at a time from a vertical stack of blanks supported between guideways 21 to the bed 22 of the machine. Attached to the bed 22 are ways 23 which support for vertical reciprocation a bracket 24 carrying one or more suction cups 26. When the suction cups reach the upper end of their stroke, they contact and grip the lowermost of the blanks in the stack and as the cups recede they draw the lower most blank downwardly, disengaging the blank 20 from detents (not shown) which prevent the remaining blanks in the stack from falling through. When the blank is deposited on the bed 22, the suction cups 26 release the blank, and it is then moved horizontally in a direction transverse to the main direction of travel of the blank through the machine by reciprocation of the kicker 27 which is arranged to slide within horizontally disposed guideways 28. The vertical reciprocation of the bracket 24 and the horizontal reciprocation of the kicker 27 are all controlled in carefully timed relationship by rocking movement of bell crank 29 about its pivot 31, said crank being connected by links 32 and 33 to the bracket 24 and kicker 27, respectively. Pitman 34 is attached to one arm of bell crank 29 and movement of said pitman upon turning of the main crankshaft (not shown) results in oscillation of the crank and hence feeding of the blanks.

The kicker 27 pushes the blank in a horizontal direction, the blank being held in alignment by the bed 22 at its underside and the guide 36 along the upper sides of the transverse edges of the blank. The spaces between bed 22 and guides 36 through which the transverse edges of the blank pass are referred to in the claims appended hereto as "first guideway." The blank is thus directed to pass between the revolving rollers 37 and 38 of the flexer 39. The upper and lower rollers revolve in opposite directions and are arranged to draw the blank between the rolls, and as the blank passes it is acted upon by breaker steels 41 and 42 positioned, respectively, in advance of and behind the rollers. Since the upper roller 37 is of greater diameter than the lower roller 38 and since the lower roller is positioned in front of the upper roller and because of the position of the breaker steels 41 and 42 with respect to the rollers, the blank is flexed to "break the grain" of the tinplate. The purposes of the flexing operation are to stretch the blank so that it will not snap back into original shape following subsequent forming operations and to prevent panelling of the blank when formed into cylindrical shape. The rollers 37 and 38 are mounted for rotation with their respective shafts 43 and 44 which bear meshing spur gears 46 and 47 respectively. The shaft 44 carries a pulley 48 around which passes driving belt 49 connected to pulley 51 on electric motor 52. Thus are the rollers 37 and 38 turned by the motor 52. The foregoing structure is conventional in bodymakers of this type.

As illustrated in Fig. 1, the arrangement of the guide 36, breaker steel 41, rollers 37 and 38, breaker steel 42 and guide 73 performs the flexing function to "break the grain" of the blank. Flexing roller 38 is below and slightly in advance of the roller 37 and the roller 38 has a lesser diameter than roller 37. Guide 36 is at a lower elevation than the line of contact between the rollers 37 and 38 and breaker steel 41 is about the level of such line of contact. Breaker steel 42 is to the right of roller 37 as viewed in Fig. 1 and functions to prevent the tin plate from following around the circumference of the roller 37 but on the contrary directs the blank down against the guide 73. Thus the blank, as it leaves the guide 36, is bent sharply upward and into contact with the breaker steel 41 whereupon it receives an abrupt downward curve which breaks the grain in one direction. The blank then passes through the line of contact between the rollers 37 and 38 and tends to follow around the roller 38 until it is forced off the roller by the breaker steel 42 which gives it an abrupt downward bend against the guide 73. The combination of bending stresses to which the blank is subjected in passing through the circuitous path which has thus been described, functions to break the grain of the blank. In Fig. 12 this circuitous path of the blank 20 through the flexing and beading rolls is illustrated.

Positioned immediately beyond the breaker steel 42 is a pair of beading rollers 53 and 54, being the upper and lower roller respectively. Said rollers are also mounted on their respective shafts 56 and 57 for rotation therewith, the shafts carrying meshing spur gears 58 and 59, the lower shaft 57 bearing a pulley 61 which is connected to pulley 51 of motor 52 by belt 62. The lower shaft 57 carries bearings (not shown) adjacent each end which are fixedly mounted in the main frame of the machine. The upper shaft 56 carries a bearing 63 adjacent each end thereof which is mounted so as to permit a slight upward and downward movement of the roller 53 to accommodate blanks of different thicknesses, and to permit free passage of the blanks through the rolls. The bearing 63 thus may move vertically within the vertical slot 64 in the main frame of the machine, there being an arcuate bearing cap 66 biased downward by spring 67 to press the bearing down and urge roller 53 into close proximity with roller 54. (See Fig. 3.) In order to prevent roller 53 from contacting roller 54 when there is no blank passing therebetween, the slot 64 has a lower abutment 68 which prevents such downward movement of the bearing 63 as would permit such contact, it being understood that from a standpoint of wear and damage to the rollers it is undesirable that they actually engage one another. For the same purpose, a screw 65 may be threaded into cap 66 and project through the coils of spring 67 and extend exteriorly of the machine. A nut 70 is threaded on said screw, and by tightening and loosening the nut the distance which the spring 67 may move the bearing 63 is fixed.

The upper roller 53 carries one or more circumferential beads 69 raised above the periphery of the roller. The dimensions of the beads, their number and spacing with respect to each other and the edges of the blank are matters of can body design for these details determine the corresponding dimensions, number, depth and position of the beads on the can body. The lower roller 54 has one or more grooves 71 in its periphery, each groove being positioned immediately beneath a corresponding bead on the upper roller. The width of the groove 71 is considerably greater than the width of the corresponding bead and the depth of the groove is greater than the height of the bead. Thus as is shown in Fig. 5, the main peripheries of the upper and lower rollers grip and hold blank 20 and the bead 69 stretches and deforms the blank to impart a bead 72 thereinto which eventually appears in the completed can body.

In operation, after the blank passes through the flexer 39 and the grain of the metal is broken, the blank is directed between the breaker steel 42 and a guide 73 attached to an upwardly projecting extension 74 of the plate 22, thus travelling in a substantially horizontal path and passing between the beading rolls 53 and 54 which impart one or more beads to the blank, as desired. The space between breaker steel 42 and guide 73 is referred to as the "second guideway" in the claims appended hereto Fig. 11(b) shows the blank after passing through the beading rollers. Thereupon the blank passes out through the gap between upper guide 76 behind roller 53 and lower guide 77 attached to upwardly projecting extension 78 of plate 22 of the machine. Breaker steel 42 and guides 73, 76 and 77 function to prevent the blank from curling around the rollers. The blank next passes under the bevelled edge 79 of cover plate 81 which, in cooperation with plate 82, holds the blank in proper flat position for subsequent operations. It should be noted that the space between cover 81 and plate 82 is greater than in ordinary bodymakers for the reason that the beading of the blank has increased the overall thickness of the blank; hence the spacing between said members must be increased to prevent flattening of the beads.

In passing through the hereinbefore described operations the blank has travelled in a direction transverse to the main path of travel through the bodymaking machine. After having been positioned between cover 81 and plate 82, suitable reciprocating feed mechanism conveys the blank longitudinally of the main portion of the machine from station to station for the performance of the subsequent operations which include the notching of the corners of the blank so that the blank has the shape shown in Fig. 11(c), bending of the longitudinal edges 85 of the blank for suitable locked side seam 116, forming the blank into a cylinder and bumping the seam 116 to lock the same. In all these operations it is important that the bead 72 imparted to the blank be preserved substantially in its original condition and the portions of the machine which are hereinafter described have as one of their important functions the preservation of the bead in the blank. Another feature is that in the completed can body the beads are continuous through the side seam, whereas in ordinary beaded cans the beads are interrupted in the regions of the side seam. For the purpose of describing and illustrating the invention as applied to these subsequent operations, it has been thought desirable to confine the present disclosure only to those portions of the machine which are essential to an understanding of the preservation of the bead in the blank. The other mechanism which makes up a completed bodymaker is, although consisting of numerous parts and of considerable complication, well known in this art.

The movement of the blank through the bodymaker is intermittent rather than continuous and as the blank reaches each of the stations at which an operation is to be performed, it is clamped in position so as not to be forced out of alignment during the forming part of the cycle. Thus, as shown in Figs. 6 and 7, at the first edging station the blank 20 is clamped between lower clamps 83 and upper clamps 84, one or the other set of which is arranged to retract a sufficient distance for clearance to permit the blank to move into and out of position before and after the edging operation. The lower clamp 83 is provided with one or more grooves cut into its surface, the location and depth of the grooves being sufficient to receive the beads of the blank. The grooves are provided with lead—i. e. are curved at a greater radius than the corresponding bead 72 which fits into the groove—so that the blank may move freely during the feed stroke without the bead sticking in the groove. (See Fig. 7.) thus when the clamps 83 and 84 are forced together to clamp the blank, the bead 72 is not flattened. It may be pointed out that it is not necessary that a projecting bead be formed on the upper clamp 84. so long as the lower clamp is relieved by grooves 86. While held in clamped position, one edge 85 of the blank 20 is struck downward so as to be bent at right angles to the blank and the other edge is struck upward at a similar angle. This operation is performed by dies 87 and 88 which have shoulders 89 and 90, respectively, which engage the edges of the blank projecting beyond the margins of the clamps 83 and 84 as the dies 87 and 88 move vertically downward and upward, respectively, to bend the edges at right angles to the blank; the blank thereupon has the shape shown in Fig. 11(d). The bead is flattend out at the bent edges 84, but not where it is engaged by the clamps 83 and 84.

The second edging station, to which the blank is moved after the first edging operation, employs lower clamps 92 and upper clamps 93 to hold the blank in position, the surface of lower clamp 92 being provided with grooves 94 to accommodate the beads in the blank in the same manner as the grooves 86 in clamp 83. At the second station, horizontally reciprocating dies 95 and 96, the leading edges 99 of which are beveled, engage the vertically bent edges 85 of the blank 20 to further bend the same to form hooks as the dies 95 and 96 move inward and the beveled edges 99 of the dies push the edges of the blank against the cooperating beveled surfaces 97 and 98 of the clamp members. The shape of the blank after passing through this station is shown in Fig. 11(e).

In Fig. 9 is shown a single station edger, this modification performing in one operation the two operations illustrated in Figs. 6 and 8. The blank is clamped in position between upper clamps 101 and lower clamps 102. The lower clamps are provided with grooves 103 cut into their upper surface, the location and depth of the grooves resembling the grooves 86 and 94. Dies 104 and 105 are oppositely beveled, the projecting tip of each die bending the edge 85 of the blank which protrudes from the margins of the clamps upward or downward, as the case may be, and, as the dies moves at about a 45° angle with respect to the horizontal, the beveled edges 107 of dies 104 and 105 bend the edges of the blanks back along a 45° angle against the beveled surfaces 108 and 109 of the clamps 101 and 102. The blank then has the shape shown in Fig. 11(e).

After the hooks have been formed in the edges 85 of the blanks 20, the blank is moved by reciprocating feed mechanism to the station at which it is formed into a cylinder. For such purpose, as is well known in this art and not illustrated herein, a pair of pivoted wing clamps seize the blank and bend it around a horn 111, which is a radially expansible cylinder of substantially circular cross-section. The oppositely hooked edges of the blank interlock so as to hold the blank in cylindrical shape. The horn 111, which is built up of segments, is caused by conventional mechanism to expand and draw the blank into a tight circular cross section, meanwhile drawing the hooked edges 85 of the blank together. A hardened, longitudinal spline 112 is fitted into the horn 111 along an element of the periphery thereof, said spline being recessed at 117 so as to accommodate four thicknesses of tinplate along the side seam of the can body and the double thickness of tinplate at the ends of the side seam. When the blank has been shaped around the horn with the interlocking edges positioned over the splline 112, a bumper 118 is brought into sharp contact with the seam, bumping the seam tightly together, the horn being bolstered by support member 119 during the bumping operation so as not to be thrown out of position.

In order to prevent flattening of the bead, circumferential grooves 113 are cut into the periphery of the horn 111 at proper locations and similarly the spline 112 is provided with grooves 114 and the bumper 118 with cooperating beads 121. Hence upon completion of the can body, there are continuous beads 72 about the circumference of the can (see Fig. 11(f), which said grooves are not interrupted at the side seam as in other beaded cans. Although in the edging operations the bead has been removed in the region of the interlocking edges, the bead is restored during the bumping operation.

Although the horn 111 is shown in Fig. 10 as being a single member, as is well understood in this art, the horn is composed of several pieces so that it expands and contracts circumferentially during the cycle of operations of the machine. Reference is made to Troyer Patent No. 1,543,460 and specifically Figs. 23 to 27, inclusive, thereof which illustrate one well known structure for such a horn. When the horn is in contacted position during the cycle of operations following the bumping operation there is a sufficient difference between the diameter of the body and the diameter of the horn to permit the can body to be moved axially off the horn by a conventional soldering machine conveyer without interference of the beads in the can body with the grooves 113 in the horn 111 or the grooves 117 in the spline 112.

In Fig. 11 are illustrated the various steps in the forming of the body. Fig. 11(a) shows the rectangular blank as fed into the bodymaking machine. Fig. 11(b) shows the blank 20 with indented beads 72 as it appears after having passed through rolls 53—54. Fig. 11(c) shows the blank after having been notched at the corners. Fig. 11(d) shows the blank after the edges have been bent at right angles by mechanism illustrated in Fig. 6. Fig. 11(e) shows the blank after the edges have been hooked inwardly by mechanism illustrated in Fig. 8 or by the single station edging mechanism shown in Fig. 9. Fig. 11(f) shows the can body cylinder after having been formed and bumped and illustrates that the beads are continuous around the circumference of the can body; the body in this figure has been rotated 90° about its axis from normal position for clarity of illustration.

The foregoing description has been devoted to the formation of beads which are indented; in other words the beads have been rolled so as to be pointed downwardly, as is shown in Fig. 4. It will be understood that the direction of the beads could be upwardly, which would involve formation of beads on roll 54 and grooves on roll 53 and the formation of grooves in clamps 84 and 93 instead of in clamps 83 and 92 and formation of beads on horn 111 and grooves in bumper bar 118.

The present invention has been illustrated and described in connection with two common styles of bodymakers, but it is adaptable with modifications which will occur to those skilled in the art to other types of machines.

What is claimed is:

1. In a beaded can bodymaker wherein flat blanks are passed individually from a stack of blanks first transversely and then longitudinally of the machine, the combination comprising a pair of parallel horizontal flexing rolls in the transverse path of travel of said blanks, the first of said flexing rolls having a larger diameter than the second, the second of said flexing rolls having its axis of rotation spaced forwardly with respect to said first roll in the transverse path of travel of said blanks, means for rotating said flexing rolls in opposite directions, a first horizontal guideway in advance of said second flexing roll and below the level of the line of contact of said rolls, a second horizontal guideway below the level of said line of contact and rearward of the axis of rotation of said first roll, a first breaker steel above the level of said line of contact and in advance thereof and partially over said guideway and said second roll, a second breaker steel rearward of said line of contact and in close proximity to said first roll and above said second guideway, said flexing rolls, guideways, and breaker steels being spaced and positioned with respect to each other so that the path of travel of said blanks therethrough is reversely bent to flex said blank in two directions beyond the elastic limit of said blanks, a pair of beading rolls located proximate said flexing rolls in the transverse path of travel of said blanks, said beading rolls having their axes of rotation parallel to said flexing rolls and substantially in vertical alignment, one of said rolls having at least one circumferential bead and the other of said rolls having a circumferential groove corresponding to each said bead, and means for rotating said beading rolls in opposite directions.

2. In a beaded can bodymaker wherein flat blanks are passed individually from a stack of blanks first transversely and then longitudinally of the machine, the combination comprising a pair of parallel, horizontal flexing rolls in the transverse path of travel of said blanks, the first of said flexing rolls having a larger diameter than the second, the second of said flexing rolls having its axis of rotation spaced forwardly with respect to said first roll in the transverse path of travel of said blanks, means for rotating said flexing rolls in opposite directions, a first horizontal guideway in advance of said second flexing roll and below the level of the line of contact of said rolls, a second horizontal guideway below the level of said line of contact and rearward of the axis of rotation of said first roll, a first breaker steel above the level of said line of contact and in advance thereof and partially over said guideway and said second roll, a second breaker steel rearward of said line of contact and in close proximity to said first roll and above said second guideway, said flexing rolls, guideways, and breaker steels being spaced and positioned with respect to each other so that the path of travel of said blanks therethrough is reversely bent to flex said blank in two directions beyond the elastic limit of said blank, a pair of beading rolls located proximate said flexing rolls in the transverse path of travel of said blanks, said beading rolls having their axes of rotation parallel to said flexing rolls and substantially in vertical alignment, one of said rolls having at least one circumferential bead and the other of said rolls having a circumferential groove corresponding to each said bead, means for rotating said beading rolls in opposite directions, means biasing said beading rolls toward engagement with each othr, and means limiting movement of said rolls toward each other to prevent actual contact between said rolls.

References Cited in the file of this patent

UNITED STATES PATENTS

| Number | Name | Date |
|---|---|---|
| 26,607 | Montgomery | Dec. 27, 1859 |
| 136,267 | Reese | Feb. 25, 1873 |
| 175,365 | Marshall | Mar. 28, 1876 |
| 400,025 | Wilmot | Mar. 19, 1889 |
| 1,094,179 | Warme | Apr. 21, 1914 |
| 1,434,229 | Schaeffer | Oct. 31, 1922 |
| 1,759,683 | Bratt | May 20, 1930 |
| 1,841,824 | Kruse | Jan. 19, 1932 |
| 1,917,359 | Cameron | July 11, 1933 |
| 1,935,391 | Cameron | Nov. 14, 1933 |
| 1,966,392 | Hodgson | July 10, 1934 |
| 2,004,596 | Biggert | June 11, 1935 |
| 2,142,235 | Burns | Jan. 3, 1939 |
| 2,213,648 | Fraser | Sept. 3, 1940 |
| 2,235,377 | Laxo | Mar. 18, 1941 |
| 2,247,952 | Laxo | July 1, 1941 |
| 2,249,788 | Saubestre | July 22, 1941 |
| 2,317,919 | Krueger | Apr. 27, 1943 |
| 2,355,448 | Kratz | Aug. 8, 1944 |
| 2,430,010 | Geertsen | Nov. 4, 1947 |
| 2,455,768 | Herman | Dec. 7, 1948 |

FOREIGN PATENTS

| Number | Country | Date |
|---|---|---|
| 2,510 | Great Britain | of 1862 |
| 557,848 | Great Britain | Dec. 8, 1943 |
| 563,268 | Great Britain | Aug. 4, 1944 |

OTHER REFERENCES

Jevons: The Metallurgy of Deep Drawing and Pressing, second edition (published by John Wiley and Sons, 1942). (Copy in Division 14.)